United States Patent [19]
Schurger

[11] 3,878,864
[45] Apr. 22, 1975

[54] BYPASS VALVE
[75] Inventor: Joseph A. Schurger, Wooster, Ohio
[73] Assignee: Borg-Warner Corporation, Chicago, Ill.
[22] Filed: Dec. 7, 1973
[21] Appl. No.: 422,646

[52] U.S. Cl. ............. 137/596.13; 137/115; 91/448; 91/451
[51] Int. Cl. ............................ F16k 11/10
[58] Field of Search ... 137/596.13, 529, 522, 596.12, 137/108, 117, 613, 596.2, DIG. 7, 115; 91/412, 433, 448, 434, 414, 442, 451; 251/122

[56] References Cited
UNITED STATES PATENTS

| 3,145,734 | 8/1964 | Lee et al. | 137/596.13 |
| 3,465,519 | 9/1969 | Mcalvay et al. | 137/596.13 X |
| 3,526,247 | 9/1970 | McMillen | 137/596.13 |
| 3,631,890 | 1/1972 | McMillen | 137/596.13 |
| 3,693,506 | 9/1972 | McMillen | 137/115 X |
| 3,718,159 | 2/1973 | Tennis | 137/596.12 |
| 3,777,773 | 12/1973 | Tolbert | 137/596.13 X |
| R26,338 | 1/1968 | Allen | 137/117 |

Primary Examiner—Martin P. Schwadron
Assistant Examiner—Robert J. Miller
Attorney, Agent, or Firm—Robert L. Zieg

[57] ABSTRACT

A differential pressure actuated bypass valve for use in a load-responsive hydraulic system for controlling a fluid actuated device including at least one manual control valve wherein said bypass valve is adapted to bypass excess fluid at a low differential pressure when no fluid is being directed to a fluid motor. The bypass valve including valve means actuatable to adjust the bypass valve to bypass fluid at a higher differential pressure when a fluid motor is actuated to extend the flow capacity of the manual valve and to provide a connection between the pump and the fluid motor through the pilot or control circuit initially.

7 Claims, 2 Drawing Figures

3,878,864

BYPASS VALVE

BRIEF SUMMARY OF THE INVENTION

The present invention comprises an improvement of the load-responsive systems described in U.S. Pat. Nos. 3,145,734; 3,631,890; and 3,693,506; each being of common assignee.

The improved hydraulic system of the present invention is provided for use with load-responsive hydraulic control systems. The hydraulic system includes a manual control valve in a working section that is adapted to sense load pressure at the motor port, and a differential pressure controlled bypass valve which is responsive to the difference between pump pressure and hydraulic motor load pressure to bypass pump outlet fluid. The improvement comprises a means of increasing the difference in pressure that is required to open the bypass valve when flow is directed to a fluid motor port by means of a signal valve inside the bypass valve. This increase in differential bypass pressure allows the control valve to be used for much higher flow rates because the higher differential bypass pressure is effective to force additional fluid from inlet port to a motor port. The lower differential bypass pressure, when fluid is not directed to a motor port, reduces the power loss and heat rise that is attendant with higher differential bypass pressures. Further, the improved bypass valve provides an initial connection through the pilot or logic circuit to initially overcome load resistance prior to connection of the pump to load pressure through the manual valve, providing a unique quick response system.

GENERAL DESCRIPTION OF INVENTION

Figure 1:
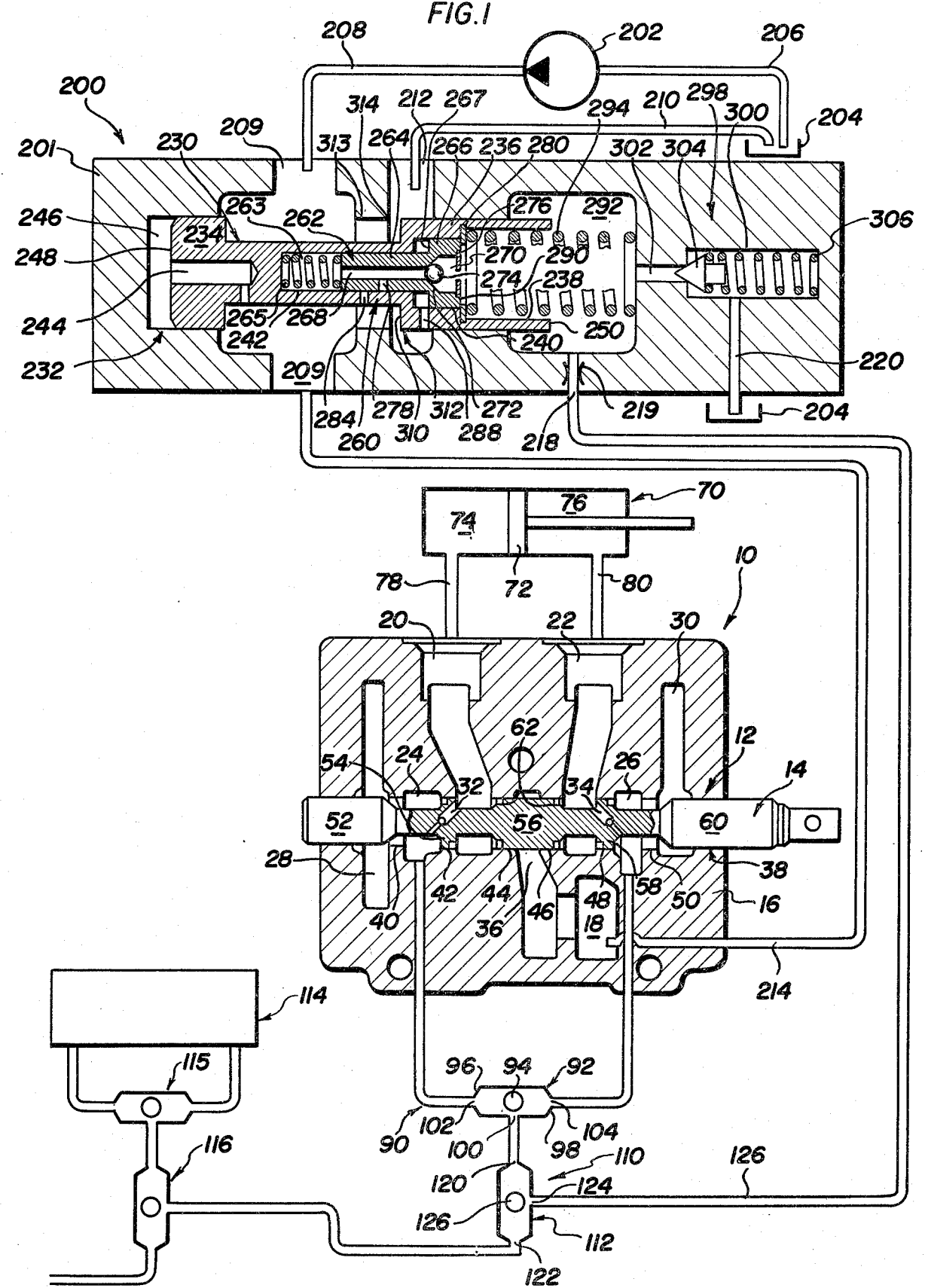
FIG. 1 is a cross section of the preferred configuration of a working section portion of a hydraulic system including a bypass valve incorporating the principles of the present invention.

Referring to FIG. 1 there is illustrated a preferred embodiment of a working section 10 of a hydraulic system comprising a manual control valve 12. Manual valve 12 includes a movable valving element or valve spool 14, casing 16, inlet port 18, motor port 20, second motor port 22, control port 24, second control port 26, sump or return ports 28 and 30, a pair of check valves 32 and 34 mounted in valve spool 14, and pressure supply port 36.

Valvle spool 14 is mounted within a bore 38 in the casing 16. The bore 38 includes lands 40, 42, 44, 46, 48, and 50. Valve spool 14 has lands 52, 54, 56, 58, and 60. The lands 52, 56, and 58 of manual valve spool 14 have metering notches formed in the edge portions thereof as indicated at 62 in FIG. 1.

The operation of the working section 10 is as follows: Fluid is supplied to inlet port 18 and enters supply port 36. Valve spool 14 is illustrated in FIG. 1 in its neutral position in which land 56 blocks supply port 36. Further, the lands 54 and 58 in this position isolate the sump or return ports 28 and 30 from the motor ports 20 and 22. When valve spool 14 is moved to the right, for example, to a first operating position, land 56 opens a fluid communication path between supply port 36 and motor port 20. The restriction of this flow path defined by an edge of the land 56 or the notches 62 and an edge of land 44 adjacent the supply port 36 can be varied by varying the position of spool 14.

This first operating position described of valve spool 14 includes the movement of land 54 into the area of motor port 20. Land 54 has a shorter effective length than motor port 20, thus load pressure in motor port 20 will be communicated around land 54 to the control port 24. The load pressure in control port 24 for certain phases of operation comprises a control signal pressure to be utilized in controlling effective input of fluid to port 18 or the effective output of the source of fluid supply, as will be later described.

The shorter effective length of land 54 can be achieved by having the land shorter than the motor port 20 or by utilizing the notches 62 of sufficient length in the land 54. Movement of valve spool 14 to the first operating position also moves land 52 into the area of land 40 in the bore 38 thus blocking communication between control port 24 and the sump or return port 28.

A second operating position of the valve spool 14 is available when the valve spool 14 is moved to the left to establish a flow path between motor port 20 and sump port 28. This flow path will be formed between the right hand edge of land 54 as illustrated in FIG. 1 or through notches 62 of land 54 and the left hand edge of land 42 as illustrated in FIG. 1. At this time an unrestricted flow path is provided between the control port 24 and sump or return port 28 since valve spool 14 is now moved to the left opening communication between control port 24 and sump or return port 28. Thus the control signal pressure in control port 24 at this time will be equal to sump pressure while fluid from the motor is being returned through motor port 20 to sump port 28.

A hydraulic work cylinder or fluid motor 70 of the double acting type is illustrated in FIG. 1 to be controlled by fluid supplied by motor ports 20 or 22 of the manual valve 12. The hydraulic work cylinder 70 includes a piston 72 separating the cylinder into chambers 74 and 76. Chamber 74 is connected to motor port 20 by conduit 78 and chamber 76 is connected to motor port 22 by conduit 80.

The operation of the valve spool 14 in a second operating position with regard to motor port 22 and its connection to supply port 36 and control port 26, and the sump port 30 is the same as described above for motor port 20. The control ports 24 and 26 are thus operable to obtain a control signal pressure, the pressure being sump pressure when the respective motor ports 20 and 22 are isolated from supply port 36 and the control signal pressure being equal to the load pressure in the respective motor port when the motor port 20 or 22 is in fluid communication with supply port 36. In the neutral position of the valve spool 14, as illustrated, both control ports 24 and 26 are in communication with their respective sump or return ports. Further, as the valve spool is moved to a position to connect one of the motor ports to the supply port, for example when spool 14 is moved to the right to connect motor port 20 with supply port 36, the control port 24 will contain a signal pressure equal to the working pressure existing in motor port 20 and thereby the pressure in chamber 74 of hydraulic motor 70, and the control port 26 will be in communicaaiton with the return port 30. When spool 14 is moved to the left to connect motor port 22 with supply port 36, control port 26 will be communicated with motor port 22, and control port 24 will be communicated with sump port or return port 28.

The working section 10, illustrated in FIG. 1, incorporates a first logic system 90 which comprises the control ports 24 and 26 and a shuttle valve 92. Shuttle valve 92 includes a movable ball 94 and first and second ball seats 96 and 98. The valve 94 includes a control signal outlet port 100 and controls signal inlet ports 102 and 104 which are connected to control ports 24 and 26 respectively. The operation of the valve 92 is such that the control port 24 or 26 having the highest control signal pressure therein will move ball 94 to engage the opposite seat 96 or 98 to connect the highest control signal pressure thereby the highest pressure in chamber 74 or 76 of fluid motor 70 to outlet port 100.

The three port shuttle valve 92 is advantageous in that when the valve spool 14 is moved to a neutral position to remove or dissipate the control signal pressure in the pilot or control circuit, the ball 94 will be unable to block both inlet ports 102 and 104 simultaneously so the control signal pressure from the outlet port 100 will be able to reverse flow to one of the control ports 24 or 26. Since spool lands 54 and 58 leave a communication path between the control ports and the sump or return ports 28 and 30 when the spool 14 is in its neutral position the reverse flow of the control signal pressure will continue to one of the sump or return ports 28 or 30 and it will be apparent that the first logic system is flow reversible.

A second logic system 110, as illustrated in FIG. 1, which comprises a shuttle valve 112 for each of the working sections in the installations where a plurality of working sections such as 10 are provided. Illustrated schematically in FIG. 1 is a second working section 114 including a first logic system having a shuttle valve 115 and a second logic system having a shuttle valve 116 in which the shuttle valves 115 and 116 are identical to valves 92 and 112 for working section 10. Each of the shuttle valves of the second logic system includes an inlet port 120 connected to outlet port 100 of first logic system 90, a second inlet port 122 connected to the next shuttle valve in the system, an outlet port 124 and a ball 126. The outlet port 124 of the second logic system, is connected by a conduit 126 with a bypass valve 200 which is adapted to control the fluid supply to the working section 10 and other working sections in the system and the bypass valve 200 comprises the inventive subject matter of the present description. The logic systems 90 and 110, conduit 126, and control ports 24 and 26 comprise a circuit including a control signal pressure to control bypass valve 200 and will be referred to generally as a pilot circuit or a control circuit hereinafter.

For a more detailed explanation of the operation of the first and second logic system described above, reference may be had to U.S. Pat. No. 3,631,890 of common assignee which sets forth the operation in great detail.

In general, through use of the first logic system at each working section the highest control signal pressure is selected for the working section and by use of the second logic system the highest control signal pressure of all working sections is selected for connection to the bypass valve 200 to control the fluid supply to the working sections. The second logic system 110 is fully reversible as is first logic system 90 since both inlet ports of the shuttle valves of the second logic system cannot be blocked at the same time.

Thus it will be apparent that the bypass valve 200 is connectable to the highest load pressure in any of the working sections and thus the fluid supply is controlled to have a capability to handle the pressure required at the location of the greatest load which is necessary for proper operation in a system having a single source of fluid supply to supply multiple working sections.

Referring to FIG. 1, the bypass valve 200 is illustrated which is connected to a source of fluid supply or pump 202. A sump 204 is provided for pump 202. A conduit 206 connects the sump to pump 202 and a conduit 208 connects bypass valve 200 to pump 202.

A conduit 210 connects a port 212 of bypass valve 200 to sump 204. A conduit 214 connects the fluid inlet 18 to bypass valve port 209. The conduit 126 from the second logic system 110 is connected to a port 218 of bypass valve 200. An orifice 219 is provided in port 218. An exhaust port 220 is provided in bypass valve 200 connected to sump 204.

As described above, the first and second logic systems cooperate to connect the highest motor port pressure of any of the working sections to conduit 126 and thus to port 218 of the bypass valve 200. In general, the bypass valve 200 operates to bypass a certain amount of flow from pump 202 through port 212 and return conduit 210 to sump 204 in response to the pressure differential between the pressure in the control or pilot circuit conduit 126 and port 218 and the pump pressure supplied through port 209 to fluid pressure inlet port 18. As will be described, bypass valve 200 works in a novel manner to bypass flow at very low standby pressure when manual valve 14 is in its neutral position and will bypass flow at an increased pressure differential when one of the control valve sections is supplying pressure to its respective fluid motor. The bypass valve includes a unique signal or switch valve structure to accomplish the above function and to further provide the function that pump pressure will initially be connected through the control or pilot circuit comprising conduit 126 and one of the control ports in a manual valve to initially overcome the resistance of the load at one of the fluid motors 70.

Bypass valve 200 includes a valve spool 230 which is slidable in a bore 232 provided in the valve casing 201. Spool 230 has a land 234 and a land 236 thereon. A three stepped counter-bore is provided in spool 230 comprising a large diameter bore 238 at the right hand end thereof as viewed in FIG. 1, a smaller diameter bore 240, and yet a smaller diameter bore 242. A fluid passage 244 is provided in the spool 230 in the area of land 234 which communicates with the groove between the lands 234 and 236 and a chamber 246 enclosed by land 234 of spool 230 within valve casing 201. A fluid responsive area or surface 248 provided on the end of valve spool 230 partly defining chamber 246. A fluid responsive area 250 is formed on the right end of valve spool 230 defined by the diameter of the bore 238 and the outer diameter of land 236.

Mounted within the stepped bores 242, 240 and 238 is the unique signal or switch valve of the present bypass valve structure. The signal valve 260 comprises a piston member 262 having a small diameter section 264 fitting within bore 242 and a large diameter section 266 fitting within bore 240. A central passage 268 is provided in piston 262 extending therethrough. Piston section 264 together with bore 242 defines a fluid chamber 263. A spring 265 is provided in chamber 263 engaging piston 262. A counter-bore 270 is provided on the right hand side of piston 262. A conical seat 272 is formed extending between passage 268 and counter-bore 270. A ball 274 is provided capable of engaging seat 272 to block passage 268. A retainer 276 is provided to maintain the ball 274 in the area of counter-bore 270. A passage 278 is provided communicating passage 268 of piston 262 with the exterior surface of diameter 264. A retainer comprising a snap ring or equivalent structure 280 is provided mounted in the bore 238 in valve spool 230 to retain piston 262 within the bores 242, 240 and 238. A radial passage 284 connects bore 242 of spool 230 with the exterior surface of the spool in the area of the groove between lands 234 and 236. A radial passage 238 extends between the interior of bore 240 and the exterior surface of land 236. The difference in areas between lands 264 and 266 on piston 262 forms a fluid responsive surface or shoulder 267. The right hand end of the piston 262, in general, defines a fluid responsive area or surface 290 which would include all of the area of the land 264 within the bore 240 when ball 274 is in engagement with seat 272.

A chamber 292 is provided within valve casing 201 within which the end of land 236 of spool 230 extends. A spring 294 is provided in the chamber 292 in engagement with retainer 280 to urge spool 230 to the left as viewed in FIG. 1. A relief valve 298 is provided within the valve casing 201 including a bore 300 connected to chamber 292 by passage 302. A conical poppet 304 is provided, which is urged into engagement with casing 201 in the area of passage 302 to block same by a spring 306.

As will be later described, relief valve 298 serves as a maximum pressure relief valve for the system since chamber 292 and thereby passage 302 is always connected by the logic systems 90 and 110 to the highest pressure within the system and can open to relieve pressure beyond a predetermined maximum setting. A fluid responsive area or surface 310 is formed by the difference in diameter between grooved portion of spool 230 and land 236. An edge 312 is defined by surface 310 and land 236. A land 313 is provided in valve casing 201 adjacent port 212 having an edge 314 at the right end thereof.

The operation of the unique bypass or unloading valve 200 of the present invention is as indicated above to maintain a low standby pressure within the system when valve spool 14 is in neutral position and to provide a connection through the bypass valve and control or pilot circuit to the motor port to supply pump pressure initially to overcome load resistance and to maintain the bypass pressure level at a higher level when the connection between the inlet port 36 and the motor port 20 or 22 is open.

Further, as described above, when the manual valve spool 14 is moved from its neutral position initially a fluid flow path is completed between one of the control ports and a motor port. Prior to this connection being opened, there is no pressure in chamber 292 since the valve spool is in neutral condition and there is little resistance to movement of the valve spool 230 to the right, and pump pressure in conduit 208 acting on fluid responsive area 310 and fluid responsive area 248 will keep spool 230 to the right sufficiently to open a passage between edge 314 of land 313 and edge 312 of valve spool 230 to bypass the pump pressure through port 212 to sump 204 at a very low pressure level.

As described when manual valve spool 14 is moved to actuate fluid motor 70 to supply fluid pressure to chamber 74, initially motor port 20 is connected across land 54 to control port 24 and through the logic system and port 218 to chamber 292 of bypass valve 200. Initially this pressure actuates the signal or switch valve 260. Pressure in chamber 292 acts on fluid responsive area 290 to move the switch valve piston 262 to the left against the force of spring 265 to place passages 284 and passage 278 in communication. This will allow a portion of the fluid flow from pump 202 to flow through passages 284, 278, and 268 to move ball 274 from its seat and connecting this portion of pump flow through orifice 219 to conduit 126 and through the first and second logic systems 110 and 90, control port 24 and motor port 20 to chamber 74. By this means the chamber 74 will be pressurized to an amount to overcome the resistance of the load initially through the pilot or control circuit. At the same load pressure in chamber 74 is also acting on fluid responsive area 250 and 290 to urge valve spool 230 to the left to shut off the pump flow bypass through port 212 and elevate the pressure supplied by the pump through conduits 208 and 214 to pressure supply port 36. Initially, flow will be in the direction from the pump through the circuit described above and through the pilot or control circuit to the motor port 20 since the pressure at the inlet port 209 is initially higher by an amount equal to the pressure equivalent of the valve spring 294 in chamber 292. As pressure flows into the pilot or control circuit through orifice 219 a pressure increase occurs in chamber 292 which will also act on fluid responsive areas 290 and 250 to further elevate the pump bypass pressure. When this occurs, the pressure equivalent of the bypass valve spring 294 plus the additional pressure created by the controlled flow through the orifice 219 will establish a constant pressure differential or pressure drop across the variable orifice which is established in the manual control valve 12 to provide for positive and consistent metering response of manual valve spool 14 to actuate a load with fluid motor 70.

When the manual valve spool 14 is returned to neutral from a power or operating position, as described, the pilot or control circuit comprising conduit 126 and control ports 24 and 26 will be vented to sump through the ports 28 and 30. This will relieve the pressure acting on fluid responsive area 290 of signal valve 260 and will allow the spring 265 to move piston 262 to the right interrupting the connection between passages 284 and 260 thus cutting communication of pump flow into conduit 126. Pump pressure then acting on fluid responsive area 248 will then move valve spool 230 to the right to again bypass the entire pump flow to sump at a greatly reduced pressure differential. When valve spool 14 is returned to neutral position, check valves 32 and 34 allow the flow in the control circuit to remain in communication with the motor ports until the control port 24 or 26 is open to its associated sump port 28 or 30 preventing fluid from flowing into the temporarily blocked control port to thereby prevent an undesirable sudden increase in pressure in the control or pilot circuit.

From the above it will be apparent that the improved and unique bypass or unloading valve 200 operates to initially provide a connection between the pump 202 and the pilot or control circuit to initially overcome load resistance with pressure to provide a quick response system. At the same time, the operation of the signal valve 260 within the unloading valve piston spool provides a very low standby pressure in the system, since almost the entire pump flow is bypassed to sump when the manual valve is in its neutral position; but when the manual valve is first moved from its neutral position, the unloading valve is actuated to produce a substantially higher pressure differential across the bypass valve. This higher pressure differential or bypass pressure allows the manual valve 12 to handle much higher flow rates because the higher pressure is effective to force additional fluid through the manual valve. Of course, the lower differential bypass pressure in neutral condition reduces power losses and prevents heat rise attendant with higher differential bypass pressures.

Figure 2:
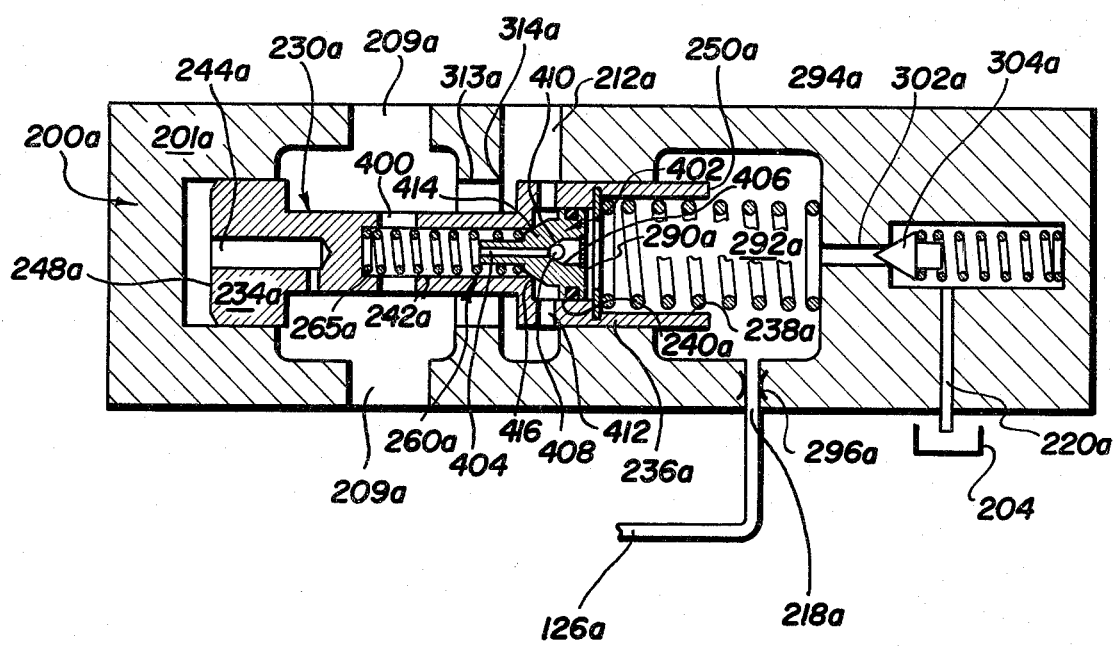
FIG. 2 is a cross section of a modified form of bypass valve.

Referring to FIG. 2, a modified form of bypass valve 200a is illustrated similar to valve 200 of FIG. 1, incorporating the inventive principles of the present invention. The same numerals are used in FIG. 2 to indicate like parts of valve 200a to the structure of valve 200 with the addition of the suffix small "a." Referring to the parts of the modified valve of FIG. 2 which are different, there is provided in the bore 242a, large radial passages 400 which connect pump supply port 209a to the interior of bore 242a. The signal valve 260a comprises a poppet 402 having a fluid responsive area 290a thereon having a central passage 404 therethrough. A counter-bore 406 is provided including a ball 408 adapted to engage a seat 410 to close passage 404. A second radial bore 412 is provided connecting bore 240a with the exterior of land 236a and thus to return port 212a in all positions of valve spool 230a. Signal valve poppet 402 has a conical surface 414 thereon which can engage an edge portion 416 in the area where bores 242a and 240a meet.

The operation of valve 200a of FIG. 2 is that in the neutral position of manual valve 12, pump pressure will again be bypassed to port 212a by the pressure acting on fluid responsive area 248a and moving valve spool 230a to the right. At the same time, a portion of this pump flow in the neutral condition will pass through passage 404 of the poppet 402 into the pilot circuit 126a and through the first and second logic circuits and control ports 24 and 26 to the sump. Thus a neutral flow path is formed in the neutral condition through the signal valve of the unloading valve 200a. Further, in the neutral condition, the poppet 402 will be moved to the right by spring 265a to unseat surface 414 with edge 416 so that additional pump fluid can flow through radial passage 412 to the sump, forming an additional neutral pump flow path. With the construction of FIG. 2, when manual valve 12 is moved from its neutral position the initial pressure acting on fluid responsive area 290a will move poppet 402 to the left to engage surface 414 with edge 416 to shut off the pump flow through radial passage 412 to the sump. This will then interrupt the secondary neutral flow passage to the sump and tend to move valve spool 230a to the left to throttle off pump flow and provide an increased pressure differential while still connecting pump flow through passage 404 and the pilot or control circuit to the fluid motor as in the case of the unloading valve 200.

The valve 200a of FIG. 2 thus provides the same function as valve 200 providing a low standby pressure and in providing an initial connection between a part of the pump flow through the pilot circuit to overcome the load resistance and provide a quick response system. The main difference between the valves 200 and 200a being that the valve 200a provides a one-way connection between the pump and the pilot circuit at all times.

Various features of the invention have been particularly shown and described, however, it should be obvious to one skilled in the art that modifications may be made therein without departing from the scope of the invention.

What is claimed is:

1. A differential pressure actuated bypass valve for use in a hydraulic control system having a control valve with pressure inlet, motor, and fluid return ports and a movable valving element; including a source of fluid supply connected to said inlet port, said control valve having a neutral position, a control circuit associated with said control valve and adapted to be connected to a motor port when said control valve is moved from its neutral position, said bypass valve being connected to said source of supply, said bypass valve being connected to said control circuit and adapted to be connected to said motor port through said control circuit whereby said bypass valve is operative to bypass fluid from said source to said sump as a function of the difference in fluid pressure between said inlet port and said motor port, said bypass valve having fluid-responsive valve means responsive to fluid pressure in said motor port, and said fluid responsive valve means having means providing a fluid connection between said source of supply and said motor port through said control circuit to initially overcome load resistance.

2. A bypass valve as claimed in claim 1 wherein said fluid responsive valve means has a fluid responsive area thereon exposed to fluid pressure in said control circuit.

3. A bypass valve as claimed in claim 1 said bypass valve including a valve spool and said fluid responsive valve means being mounted within said valve spool.

4. A bypass valve as claimed in claim 3 including bias means within said valve spool adapted to move said fluid responsive valve means to a position interrupting the connection between said source of fluid supply and said motor port through said control circuit.

5. A bypass valve as claimed in claim 4 including a one-way valve means adapted to prevent flow of fluid from said control circuit through said fluid responsive valve means.

6. A bypass valve as claimed in claim 1 wherein said control circuit includes logic means adapted to connect said circuit to the motor port having the highest pressure therein.

7. A differential pressure actuated bypass valve for use in a hydraulic control system having a control valve with pressure inlet, motor, and fluid return ports and a movable valving element; including a source of fluid supply connected to said inlet port, said control valve having a neutral position, a control circuit associated with said control valve and adapted to be connected to a motor port when said control valve is moved from its neutral position, said bypass valve being connected to said source of supply and said sump, said bypass valve being connected to said control circuit and adapted to connect said source to said motor port through said control circuit whereby said bypass valve is operative to bypass fluid from said source to said sump as a function of the difference in fluid pressure between said inlet port and said motor port, said bypass valve including fluid-responsive valve means responsive to fluid pressure in said motor port and adapted to modify said difference in fluid pressure at which said bypass valve will bypass fluid, said fluid responsive valve means including a connection connecting said source to said motor port through said control circuit, said fluid responsive valve means having a connection to sump associated therewith whereby when said control valve is in its neutral position a portion of fluid flow from said source will flow to sump through said fluid responsive valve means, and said fluid responsive means moving to interrupt said connection in response to fluid pressure in said control circuit.

* * * * *